Nov. 20, 1962  S. J. GARTNER  3,064,986
DELAYED RELEASE CHUCK
Original Filed Dec. 24, 1946  2 Sheets-Sheet 1
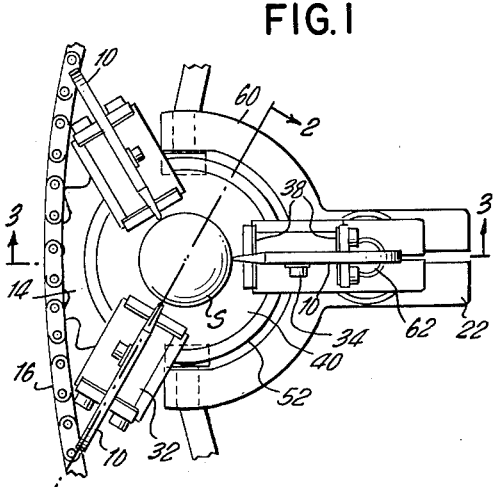
FIG. 1
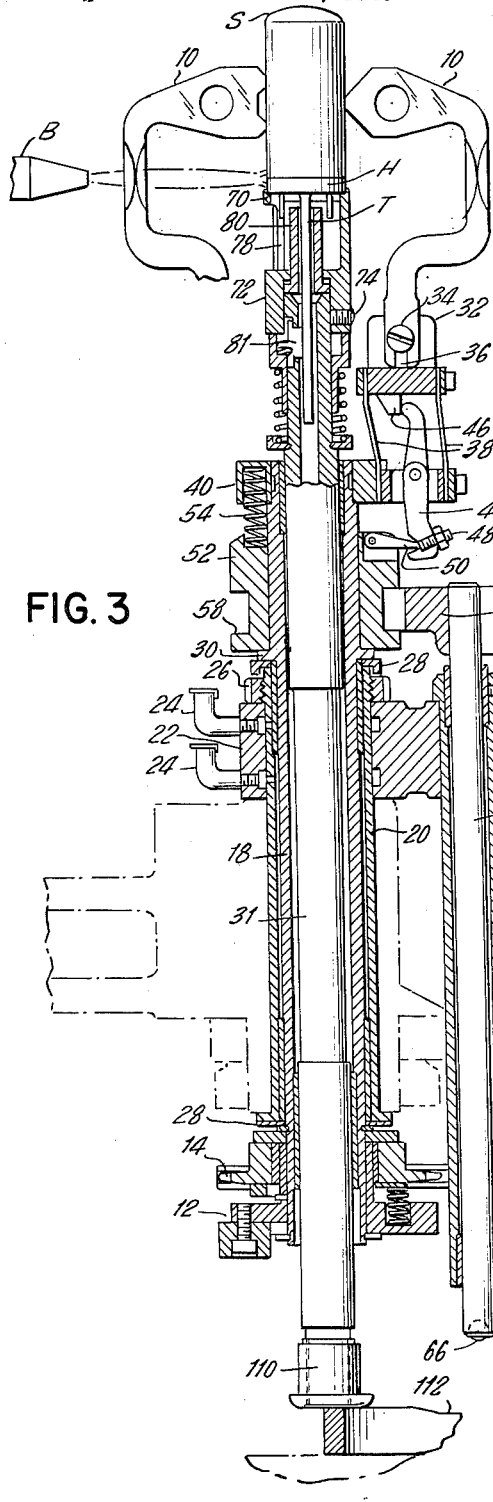
FIG. 3
FIG. 2
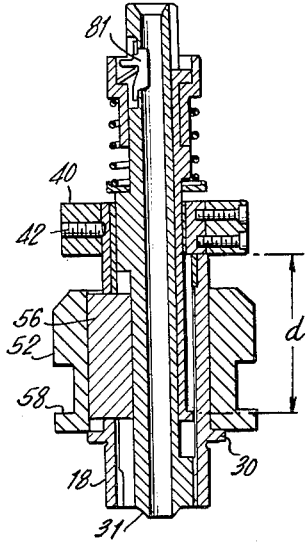
INVENTOR.
STANLEY J. GARTNER
BY
J. Albert Hultquist
ATTORNEYS Nov. 20, 1962  S. J. GARTNER  3,064,986
DELAYED RELEASE CHUCK
Original Filed Dec. 24, 1946  2 Sheets-Sheet 2

INVENTOR.
STANLEY J. GARTNER
BY
ATTORNEYS 3,064,986
DELAYED RELEASE CHUCK
Stanley J. Gartner, Emporium, Pa., assignor, by mesne assignments, to Sylvania Electric Products Inc., Wilmington, Del., a corporation of Delaware
Application Oct. 14, 1953, Ser. No. 394,587, now Patent No. 2,907,141, dated Oct. 6, 1959, which is a division of application Ser. No. 718,152, Dec. 24, 1946, now Patent No. 2,661,576, dated Dec. 8, 1953. Divided and this application May 27, 1959, Ser No. 831,451
11 Claims. (Cl. 279—66)

This invention relates to the manufacture of radio tubes and like devices. This application is a division of application Serial No. 394,587, filed October 14, 1953, which matured into U.S. Patent No. 2,907,141 of October 6, 1959, which in turn is a division of application Serial No. 718,152, filed December 24, 1946, which matured into U.S. Patent No. 2,661,576 of December 8, 1953.

Among the objects of the invention are to provide: new and useful chucks suitable for spindles in processing apparatus; an improved form of chuck for gripping a glass exhaust tube; a chuck for reliably gripping brittle articles with a minimum of impact; a pair of coaxial chucks to grip a pair of assembled parts with the supporting and operating mechanism of both chucks located at the same end of the parts assembly; a chuck the jaws of which may be interposed in the path of flames without impairing the uniform heating of the parts gripped; and an organization, having generally improved features, for making a glass seal between a pair of cylindrical parts.

The illustrative embodiment of the invention is for sealing together a "shell" and a "mount" to constitute an unevacuated envelope encasing electrodes in a well-known process of manufacturing radio tubes and the like devices. In this process the shell is usually a glass cylinder closed at one end, although it may be of metal having its edge prepared for a glass seal; and the mount is made up of a cupped or flat glass header large enough to close the open end of the shell, a number of metal leads extending perpendicularly through the header, the electrodes or "mount assembly" supported on the leads above the header, and an exhaust tube extending centrally from below the header. The unit comprising the exhaust tube, the header and the metal leads, before the mount assembly is attached, is termed the "stem," although the entire assembly after the mount assembly is attached is frequently called the stem (rather than the mount as defined above). In describing the illustrative embodiment of the invention the terms "mount" and "stem" are used interchangeably.

In prior art sealing machines there were multiple spindles each comprising a stem chuck and a shell chuck, the stem chucks being carried by a turret and the shell chucks being axially aligned with the stem chucks and carried from a ponderous superstructure, to expose the opposed shell and stem edges to the sealing flames. It is a further object of the present invention to eliminate the superstructure, for many attendant advantages, without impairing the proficiency of the sealing machine.

Further features of novelty and objects will be apparent from the following detailed disclosure of a preferred embodiment of the invention with reference to the attached drawings, wherein:

FIG. 1 is a plan view of a spindle comprising coaxial chucks embodying the invention;

FIG. 2 is a sectional view along the line 2—2 of FIG. 1 illustrating a preferred form of exhaust-tube chuck;

FIG. 3 is a longitudinal sectional view along the line 3—3 of FIG. 1;

Figure 7:
FIG. 7 is a sectional view along the line 7—7 in FIG. 4.

Referring now to the drawings, the preferred forms of envelope chuck, exhaust-tube chuck, and the arrangement of these two chucks in relation to each other and to their operating mechanisms will be described. The assembly of chucks and their supports are mounted for rotation, and constitutes a spindle.

Figure 4:
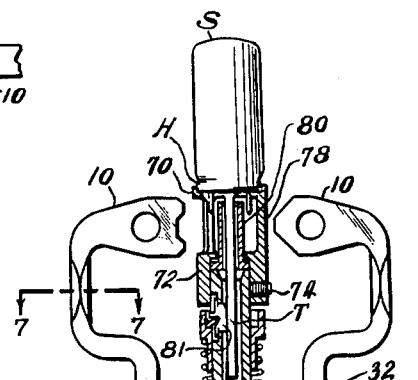
FIG. 4 is a fragmentary sectional view similar to FIG. 3, with the parts shown in their configuration at the time of release of the fused envelope.
Figure 5:
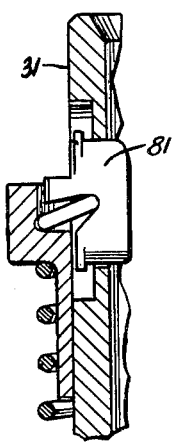
FIG. 5 is an enlarged detail view of a portion of the mechanism of FIG. 2.

In FIGS. 1 and 3 shell S is shown centered on the spindle by means of three jaws 10. The shell is held in axial alignment with a stem (comprising header H, exhaust tube T, external pins, and a mount assembly within the shell) so that flame from burner B may soften the opposed edges of the header and the shell to form a sealed envelope. The header is supported and the exhaust tube is gripped on the spindle which is intermittently indexed with turret 11 (FIG. 4). At most positions of the turret each spindle is rotated about its axis.

Rotation of each of the spindles is effected by means of the usual friction clutch 12 which is engaged with pinion 14, maintained in rotation when the spindle is in the firing positions by means of a chain 16 (FIG. 3). Clutch 12 is secured to drive a generally tubular member 18 which is carried in the turret by means of bushing 20. Pinion 14 is rotatable on member 18. With pinion 14 in rotation, clutch 12 is arrested under certain circumstances, to lock the spindle, by a latch (not shown) adjacent the turret. Above the turret is a bearing block 22 for each of the spindles through which lubrication may be supplied to the respective members 18 by oil cups 24. Bushings 20 are externally threaded at their upper ends and flanged at their lower ends, so that they can be locked to the turret by castellated nuts 26, thus clamping blocks 22 in place.

Each member 18 has an annular rib 30 supported on washer 28 above bushing 20, and contains a shaft 31 for supporting header H and for operating the gripper for exhaust tube T. Above each rib 30 there is a mechanism for supporting and operating jaws 10 for the shells.

*Shell Chuck*

Figure 8:
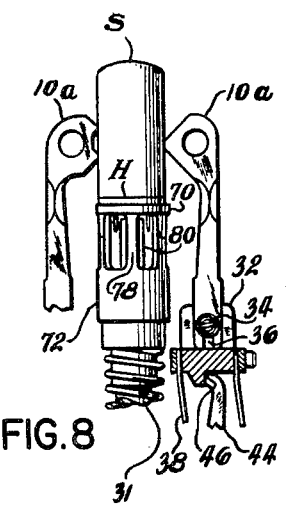
FIG. 8 is a fragmentary lateral view of a spindle showing a modified form of shell chuck jaws.

In the prior art, the mechanism for supporting and operating the shell jaws was located vertically above the spindle. With that arrangement there was no barrier between burner B and the opposed portions of shell S and header H. However, for the purposes of the present invention the supporting and operating mechanisms for the jaws are located below the header support. In this way it is feasible to reduce the over-all height and mass of the equipment, to improve the accessibility of the spindles, and generally to simplify the operating mechanisms. Shell jaws 10 are supported from below and, in one form are bowed outward, resembling question marks, contacting the shell S at their upper extremities. Jaws 10 are transversely streamlined at the level of the burners B in the direction of the flame (FIG. 7) for uniform heating of the glass edges and (later) the seal. But for this streamlining jaws 10 might form a baffle at three parts of the seal opposite the three jaws shown. In a modified construction the jaws 10a are streamlined but not bowed (FIG. 8).

Two of the jaws 10 have two points at which they contact shell S whereas the third has but a single point of contact. In this way the two-point jaws form a sort of vertical cradle for supporting shell S against the pressure applied by the single-point-of-contact jaw when all three jaws are pressed toward each other.

Jaws 10 are supported on blocks 32 for vertical adjustment by means of screw 34 in block 32. Each of the jaws is slotted at 36 to accommodate this screw, and each of the jaws is confined within a vertical groove in block 32.

Jaws 10 are so supported and operated as to allow the header support to raise the radio tube with its complete seal into a position of clearance for removal (FIG. 4) and to allow renewed loading of a stem and of a shell thereon. The assembly is then lowered properly within jaws 10 and the shell is gripped. According to the present invention the shell jaws are supported and operated from below in such manner as to cause them to approach radially and without any pivotal swing toward the spindle axis. This is an important consideration, for with appreciable swing the jaws would develop considerable momentum. This would result in hazardous impact when the jaws engage shell S which commonly is of glass. The support and operating mechanism to be described is provided so that the jaws may be controlled from a position not merely below their point of engagement with the shell S but also below the level of burner B.

Each block 32, which carries its jaw 10, is mounted for substantially horizontal shifting on pairs of leaf springs 38, these leaf springs functioning as a parallel linkage to restrict jaws 10 against pivotal motion, and to restore jaws 10 into a position of clearance for removal when released by the operating mechanism. At their lower extremities springs 38 are secured to support 40 which is, in turn, secured to rotary tubular member 18 by means of a set-screw 42 (FIG. 2).

Support 40 pivotally carries one lever 44 for each of the three jaws 10. At its upper end each lever 44 contacts a depending portion 46 of block 32. At its lower end each lever 44 carries an adjustment screw 48 and lock nut, which screw transmits thrust from arm 50 to lever 44 and the jaws 10. There are three arms 50, one for each lever 44, supported on ring 52 which is slideable along tubular member 18 and is normally depressed against rib 30 by compression spring 54. Ring 52 is restricted against rotation with respect to member 18 by key 56 (FIG. 2) confined within opposed keyways in ring 52 and member 18. Ring 52 of each of the spindles is grooved at 58 for snug engagement by yoke 60 (FIGS. 1, 3, and 4), clamped to the upper end of slideable rod 62 at the lower end of which is a socket and an antifriction ball 66. This rod is slideable in lubricated bushing 64 which is clamped within a slotted bore in block 22.

Figure 6:
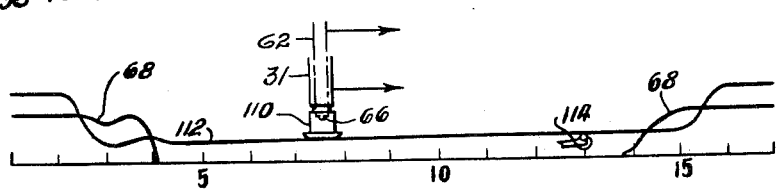
FIG. 6 is a timing chart.

In operation, the spindles are carried intermittently in a circular path around the machine from one station to another. They are rotated continuously, except at the loading and unloading stations. In the course of this travel of the spindles, all of the rods 62 are carried above a stationary cam-track 68 on the machine base (FIG. 6). Normally, as shown in FIG. 3, rod 62 is left unsupported at its lower extremity, and compression spring 54 and the weight of ring 52, yoke 60 and rod 62 cause arm 50 to swing counterclockwise (compare FIGS. 4 and 3) thereby pivoting lever 44 counterclockwise, and moving all three jaws 10 into contact with shell S. This motion occurs just as cam-follower 66 drops off cam 68 (FIG. 6). The spring-and-weight assembly causes firm engagement of the jaws with shell S, yet resiliency of the leaf springs and the jaws accommodates variations in the diameter of the shell. Jaws 10 move through a relatively short path into contact with the shell, the upper ends of the jaws traveling the same distance as blocks 32 and in a parallel path. The impact of the jaws as they contact shell S is vastly reduced as compared to the impact of any practical form of jaws which move pivotally toward the shell.

When rod 62 is raised, leaf springs 38 move jaws 10 radially outward to release the shell.

Stem Chuck and Support

Header H is supported on a ring 70 which forms part of an adapter 72 secured by set screw 74 to the upper end of innermost tube 31 of the spindle. Ring 70 is spaced from the body of adapter 72 by three legs 78, whereby preheating and cooling gases may be directed against the bottom of the header H. Exhaust tube T is protected against these gases by tubular baffle 80 which rests on the top of tube 31, and forms part of the adapter. Certain aspects of this adapter are disclosed and claimed in copending U.S. application Serial No. 693,146, filed August 26, 1946, by Clayton R. Cowley, which matured into U.S. Patent No. 2,484,688 of Oct. 11, 1949. The header H is supported by means of three grippers 81 which are movable radially to grasp the tube T in response to movement of the tube 31 as well be described below.

Cycle of Operations

Referring now to FIG. 6 the complete cycle of operation of the sealing machine will be described illustrating the advantageous features of the chucks and specifically the shell chuck. The timing chart shown there is divided into 16 intervals, whereby each of 16 spindles may in stepwise succession by positioned at any given processing station. The timing chart actually shows the contour of the stationary cam tracks mounted on the machine bed along which cam followers 66 and 110 are moved by the spindle-supporting turret. During the travel of the spindle from the first to the second station in FIG. 6, jaws 10 and grippers 81 remain retracted and adapter 72 is elevated above jaws 10. During this interval the spindles do not rotate. Header H may be inserted, and shell S may be placed above the header which at this stage of manufacture carries the internal electrode assembly of the radio tube or like device. During the transit of any given spindle from the second to the third station, cam-follower 110 travels along cam surface 112, initially causing grippers 81 to engage exhaust tube T, and then lowering the shell-and-header assembly into position for engagement by jaws 10. At the third station, by virtue of the shape of cam 68 which operates cam-follower 66, jaws 10 are moved firmly but with a minimum of impact into engagement with shell S to center the shell roughly on header H. Thereafter, during the indexing operation from the third to the fourth station, jaws 10 are opened, then closed again, and finally adapter 72 is raised very slightly so as to press header H firmly into abutment with shell S. When shell S is thus held at a definite level by closed jaws 10, the stem chuck-and-support 31 is allowed to drop slightly between stations 4 and 5 to space shell S slightly above header H. Rotation of the spindles and firing are then commenced. By virtue of key 56 (FIG. 2) drive is transmitted not only to ring 52 but also to shaft 31, having a keyway therein, for driving the two chucks in perfect synchronism. This is an additional advantage of supporting both chucks from one end of the shell-and-stem assembly.

From the fifth station until the twelfth, various burners are brought to bear on the edges of the shell and the header so as to preheat them and ultimately to fuse their edges. Preheating flames are optionally brought to bear on the bottom of header H, to minimize internal strains. By the time any spindle reaches station 13 the edges of shell S and header H have already been fused. Roller 114 reciprocates vertically under cam follower 110 of the header support, thereby to move the fused edge of the header into contact with the soft edge of the shell, forming the seal, and promptly thereafter to allow cam follower 110 to drop so as to stretch the seal. This reciprocation is of the order of $\frac{1}{16}$ of an inch.

During the travel of a spindle from station 13 to station 15, the seal is allowed to cool. A rise in cam 68, between stations 14 and 15 causes jaws 10 to be retracted from shell S. Thereafter the sealed envelope is carried upward rapidly, and during the slow, final elevation of adapter 72, exhaust tube grippers 81 are released to allow removal of the product.

The chucks described cooperate to constitute the spindle of an improved sealing machine, but it will be recognized that they may also be separately useful in other sealing machines and in other combinations.

What I claim is:

1. A chuck for gripping, reciprocating, and releasing an article comprising a carrier, a support mounting said carrier for reciprocation relative thereto, actuating means operatively connected to reciprocate said carrier, a plurality of opposed grippers mounted on said carrier for reciprocation therewith and movement toward and away from each other in a gripping and releasing action, a driver mounted on said carrier for reciprocation relative thereto, means operatively connecting said driver to said grippers to cause said gripping and releasing action in response to reciprocation of said driver relative to said carrier, means operatively connected between said driver and said carrier to resiliently bias said driver relative to said carrier in a direction to cause said gripping action, and arresting means engaging said support and positioned to arrest said driver in response to reciprocation of said carrier whereby to move said driver relative to said carrier in a direction to permit said releasing action.

2. A chuck for gripping, reciprocating, and releasing an article comprising a carrier, a support mounting said carrier for reciprocation relative thereto, actuating means operatively connected to reciprocate said carrier, a plurality of opposed grippers mounted on said carrier for reciprocation therewith and movement toward and away from each other in a gripping and releasing action, a driver mounted on said carrier for reciprocation relative thereto, means operatively connecting said driver to said grippers to cause said gripping and releasing action in response to reciprocation of said driver relative to said carrier, means operatively connected between said driver and said carrier to resiliently bias said driver relative to said carrier in a direction to cause said gripping action, and arresting means engaging said support and positioned to arrest said driver in response to reciprocation of said carrier whereby to move said driver relative to said carrier in a direction to permit said releasing action, said arresting means being arranged to arrest said driver only after a predetermined travel of said carrier.

3. A chuck for gripping, reciprocating, and releasing an article comprising a hollow sleeve, a support mounting said sleeve for longitudinal reciprocation relative thereto, actuating means operatively connected to reciprocate said sleeve longitudinally, peripherally spaced gripper ports formed in said sleeve, opposed grippers reciprocable with said sleeve and mounted in said gripper ports for radial movement relative to said sleeve whereby to grip and release an article in the interior of said sleeve, retainer flanges on said grippers and said gripper ports to limit radially inward travel of said grippers, a driver mounted on the exterior of said sleeve and longitudinally slidable relative thereto, means operatively connecting said driver to said grippers for radial motion of said grippers in response to longitudinal motion of said driver relative to said sleeve, means operatively connected between said driver and said sleeve to resiliently bias said driver relative to said sleeve in a direction to move said grippers radially inward in a gripping action, a stop affixed to said support, and connecting means constructed to connect said stop to said driver for arresting said driver in response to reciprocation of said sleeve whereby to slide said driver relative to said sleeve in a direction to permit said grippers to move radially outward in a releasing action.

4. A chuck for gripping, reciprocating, and releasing an article comprising a hollow sleeve, a support mounting said sleeve for longitudinal reciprocation relative thereto, actuating means operatively connected to reciprocate said sleeve longitudinally, peripherally spaced gripper ports formed in said sleeve, opposed grippers reciprocable with said sleeve and mounted in said gripper ports for radial movement relative to said sleeve whereby to grip and release an article in the interior of said sleeve, retainer flanges on said grippers and said gripper ports to limit radially inward travel of said grippers, a driver mounted on the exterior of said sleeve and longitudinally slidable relative thereto, means operatively connecting said driver to said grippers for radial motion of said grippers in response to longitudinal motion of said driver relative to said sleeve, means operatively connected between said driver and said sleeve to resiliently bias said driver relative to said sleeve in a direction to move said grippers radially inward in a gripping action, a stop affixed to said support, and connecting means constructed to connect said stop to said driver for arresting said driver in response to reciprocation of said sleeve whereby to slide said driver relative to said sleeve in a direction to permit said grippers to move radially outward in a releasing action, said connecting means being arranged to arrest said driver only after a predetermined travel of said sleeve.

5. A chuck for gripping, reciprocating, and releasing an article comprising a hollow sleeve, a support mounting said sleeve for longitudinal reciprocation relative thereto, actuating means operatively connected to reciprocate said sleeve longitudinally, peripherally spaced gripper ports formed in said sleeve, opposed grippers reciprocable with said sleeve and mounted in said gripper ports for radial movement relative to said sleeve whereby to grip and release an article in the interior of said sleeve, retainer flanges on said grippers and said gripper ports to limit radially inward travel of said grippers, a driver mounted on the exterior of said sleeve and longitudinally slidable relative thereto, means operatively connecting said driver to said grippers for radial motion of said grippers in response to longitudinal motion of said driver relative to said sleeve, means operatively connected between said driver and said sleeve to resiliently bias said driver relative to said sleeve in a direction to move said grippers radially inward in a gripping action, a stop affixed to said support, and connecting means constructed to connect said stop to said driver for arresting said driver in response to reciprocation of said sleeve whereby to slide said driver relative to said sleeve in a direction to permit said grippers to move radially outward in a releasing action, said connecting means comprising a key slidably mounted on said sleeve and having projections engaging said driver and said stop, said projections being spaced a distance to delay concurrent engagement with both said driver and said stop until said sleeve travels a predetermined distance.

6. A chuck comprising an axially reciprocable shaft formed with a keyway, a sleeve surrounding said shaft and slidable therein, grippers mounted on said shaft for radial closing and opening movement relative thereto, confronting shoulders formed on said sleeve and said grippers, a normally frustro-conical interponent engaged between said confronting shoulders deformable to approach a planar shape in response to sliding of said sleeve whereby to urge said grippers radially inward for closing thereof, and stop means including a key slidably mounted in said keyway and formed with projecting means extending radially outward of said shaft to engage said sleeve shoulder to arrest said sleeve in response to a predetermined reciprocation of said shaft whereby to open said grippers.

7. A chuck comprising an axially reciprocable shaft formed with a keyway, a plurality of grippers movable between an article engaging position and an inoperative position, a sleeve surrounding said shaft and slidable thereon for urging said grippers into article engagement, and stop means co-operable with said sleeve for moving said grippers into said inoperative position only after predetermined axial travel of said shaft, said stop means including a key slidably mounted in said keyway and formed with projecting means extending radially outward of said shaft to engage said sleeve.

8. A chuck according to claim 7 further comprising means including a spring normally urging said sleeve in the direction to urge said grippers into said article engaging position.

9. A chuck comprising an axially reciprocable shaft formed with a keyway, a plurality of grippers movable between an article engaging position and an inoperative position, a sleeve surrounding said shaft and slidable thereon for causing said grippers to engage an article, stop means, and a shoulder formed on said sleeve for engagement by said stop means only after predetermined travel of said shaft to arrest the sleeve to prevent further movement thereof with said shaft and to cause said grippers to assume said inoperative position upon further travel of the shaft, said stop means including a key slidably mounted in said keyway and formed with projecting means extending radially outward of said shaft to engage said sleeve at said shoulder.

10. A chuck comprising an axially reciprocal shaft, a plurality of grippers radially movable toward and away from the axis of said shaft between an article gripping position and an inoperative position, a sleeve positioned about said shaft and slidable thereon for urging said grippers into said article gripping position, biasing means urging said sleeve in a direction to urge said grippers into said article gripping position, and stop means for halting the movement of said sleeve with said shaft after a predetermined travel of said shaft and to oppose said bias force.

11. A chuck comprising an axially reciprocal shaft, a plurality of grippers radialy movable toward and away from the axis of said shaft between an article gripping position and an inoperative position, a sleeve positioned about said shaft and slidable thereon for urging said grippers into said article gripping positions, biasing means urging said sleeve in a direction to urge said grippers into said article gripping position, and stop means for halting the movement of said sleeve with said shaft after a predetermined travel of said shaft and to oppose said bias force, including a shoulder on said sleeve and a projection engageable with said shoulder after said predetermined movement of said shaft to engage said shoulder to halt further movement of said sleeve.

References Cited in the file of this patent
UNITED STATES PATENTS

| | | |
|---|---|---|
| 1,011,523 | Swan | Dec. 12, 1911 |
| 1,321,910 | Hastings | Nov. 18, 1919 |
| 1,942,042 | Simber et al. | Jan. 2, 1934 |
| 2,147,885 | Dean | Feb. 21, 1939 |
| 2,415,482 | Greenough | Feb. 11, 1947 |
| 2,434,664 | Malloy | Jan. 20, 1948 |